United States Patent
Kwan et al.

(10) Patent No.: US 9,066,278 B2
(45) Date of Patent: Jun. 23, 2015

(54) COMMUNICATION APPARATUS, METHOD, AND COMPUTER IMPLEMENTABLE PRODUCT FOR ADMISSION CONTROL

(75) Inventors: Raymond Kwan, Swindon (GB); Takahiro Nobukiyo, Tokyo (JP); Robert Arnott, Tokyo (JP)

(73) Assignee: NEC CORPORATION, Tokyo (JP)

( * ) Notice: Subject to any disclaimer, the term of this patent is extended or adjusted under 35 U.S.C. 154(b) by 165 days.

(21) Appl. No.: 13/817,808

(22) PCT Filed: Sep. 28, 2011

(86) PCT No.: PCT/JP2011/072910
§ 371 (c)(1),
(2), (4) Date: Feb. 19, 2013

(87) PCT Pub. No.: WO2012/043869
PCT Pub. Date: Apr. 5, 2012

(65) Prior Publication Data
US 2013/0143579 A1    Jun. 6, 2013

(30) Foreign Application Priority Data

Sep. 29, 2010   (GB) .................................. 1016362.4

(51) Int. Cl.
  *H04W 40/00*   (2009.01)
  *H04W 48/06*   (2009.01)
  *H04L 12/911*  (2013.01)
  *H04W 72/12*   (2009.01)

(52) U.S. Cl.
  CPC ............ *H04W 48/06* (2013.01); *H04L 47/822* (2013.01); *H04L 47/823* (2013.01); *H04W 72/1236* (2013.01); *H04W 72/1252* (2013.01)

(58) Field of Classification Search
  None
  See application file for complete search history.

(56) References Cited

U.S. PATENT DOCUMENTS

| 5,838,671 | A  | 11/1998 | Ishikawa et al. |
| 6,456,850 | B1 | 9/2002  | Kim et al. |
| 6,842,618 | B2 | 1/2005  | Zhang |
| 7,532,892 | B2 | 5/2009  | Hoglund et al. |
| 2002/0119796 | A1 | 8/2002 | Vanghi |
| 2002/0123314 | A1 | 9/2002 | Kitazawa et al. |

(Continued)

FOREIGN PATENT DOCUMENTS

| CN | 1146700 A | 4/1997 |
| CN | 1684400 A | 10/2005 |

(Continued)

OTHER PUBLICATIONS

Japanese Office Action dated Feb. 26, 2014, with English translation.

(Continued)

*Primary Examiner* — Suhail Khan
(74) *Attorney, Agent, or Firm* — McGinn IP Law Group, PLLC (57) ABSTRACT

A communications apparatus is described which is capable of auto-tuning a cell admission threshold value used to control admission into a communications network. The apparatus obtains an outage rate for one or more current calls at a node in the network, and also a blocking rate of the rate at which admission requests at the node are blocked and uses these rates to adjust a load threshold to be used in admission control decisions. The apparatus then controls admission of calls at the node in dependence on an estimated current load and the load threshold.

16 Claims, 4 Drawing Sheets

(56) References Cited

U.S. PATENT DOCUMENTS

| | | | |
|---|---|---|---|
| 2004/0152422 A1 | 8/2004 | Hoglund et al. | |
| 2004/0192321 A1 | 9/2004 | Zhang | |
| 2005/0068920 A1 | 3/2005 | Zhang | |
| 2006/0176815 A1 | 8/2006 | Picot et al. | |
| 2007/0265017 A1* | 11/2007 | Ishii et al. | 455/453 |
| 2011/0244874 A1 | 10/2011 | Fodor et al. | |

FOREIGN PATENT DOCUMENTS

| | | |
|---|---|---|
| CN | 101052232 A | 10/2007 |
| EP | 0750440 A2 | 12/1996 |
| EP | 1077580 A1 | 2/2001 |
| EP | 1689207 A2 | 8/2006 |
| JP | H9-84105 A | 3/1997 |
| JP | 2002-204481 A | 7/2002 |
| WO | WO02/054604 A2 | 7/2002 |
| WO | WO02/089512 A1 | 11/2002 |
| WO | WO02/091781 A1 | 11/2002 |
| WO | WO03/077582 A1 | 9/2003 |
| WO | WO03/079703 A1 | 9/2003 |
| WO | WO2010/068155 A1 | 6/2010 |

OTHER PUBLICATIONS

International Search Report in PCT/JP2011/072910 dated Aug. 12, 2011(English Translation Thereof).

Eunsung Oh et al: "Call admission control strategy for system throughput maximization considering both call- and packet-level QoSs", IEEE Transactions on Communications, IEEE Service Center, Piscataway, NJ. USA, vol. 56, No. 10, Oct. 1, 2008, pp. 1591-1595, XP011236188, ISSN: 0090-6778, 001: 10.1109/TCOMM.2008.060536.

Mueckenheim J et al: "Performance evaluation of connection admission control for W-CDMA networks using dynamic system simulations", Communications and Vehicular Technology, 2000, SCVT-200, Symposium on Oct. 19, 2000, Piscataway, NJ, USA, IEEE, Jan. 1, 2000, pp. 174-177, XP010542750,ISBN: 978-0-7803-6684-8.

Liu C H et al, "Route Capacity Estimation Based Admission Control and QoS Routing for Mesh Networks", Global Telecommunications Conference, 2009. Globecom 2009. IEEE, IEEE, Piscataway, NJ, USA, Nov. 30, 2009~ pp. 1-6,XP031646120, ISBN: 978-1-4244-4148-8.

Hongxia Sun et al, "Traffic stochastic interactions on blocking and outage probabilities in CDMA networks", Communications, Circuits and Systems, 2008. ICCCAS 2008. International Conference on,IEEE, Piscataway, NJ, USA,May 25, 2008, pp. 543-547, XP031352982,ISBN: 978-1-4244-2063-6.

Capone A et al: "Iterative interference increase estimation (1<3>E): a CAC scheme for umts uplink", 2003 IEEE Wireless Communications and Networking Conference Record : Mar. 16-20, 2003, New Orleans, Louisiana, USA, IEEE Operations Center, Piscataway, NJ, vol. 3, Mar. 16, 2003, pp. 1544-1549, XP010639999,001: 10.1109/WCNC.2003.1200616ISBN: 978-0-7803-7700-4.

Chinese Office Action and Search report dated Jan. 4, 2015.

* cited by examiner

COMMUNICATION APPARATUS, METHOD, AND COMPUTER IMPLEMENTABLE PRODUCT FOR ADMISSION CONTROL

TECHNICAL FIELD

The present invention relates to admission control of traffic into a network, particularly but not exclusively a cellular or wireless telecommunications network. The invention has particular but not exclusive relevance to auto-tuning of an admission control threshold for use in admission control decisions.

BACKGROUND ART

In cellular communication networks, it is usual to include some kind of admission control function, which regulates the admission of arriving calls into the communication network based on the current load of the network. Typically a call from a new user is admitted if the following condition is satisfied:

$$\rho + \Delta\rho \leq \rho_{th} \quad (1)$$

where $\rho$ is the current load of the cell, $\Delta\rho$ is the estimated load increase that will be caused by admission of the new user's call, and $\rho_{th}$ is a threshold parameter. Various methods are known for measuring or estimating the load value $\rho$ for use in call admission decisions.

The threshold $\rho_{th}$ represents a trade-off between blocking incoming call requests and the protection of the Quality of Service (QoS) offered to users already connected to the cell. A higher threshold results in fewer blocked calls, but may result in more users sharing the available capacity of the cell, thus reducing the QoS experienced by each connected user.

Typically the threshold $\rho_{th}$ is set 'manually' by the network operator, which may be on a per-cell basis. However, this is often challenging in practice because the relationship between the load threshold $\rho_{th}$, user QoS and blocking is not simple to predict. An estimate of a suitable threshold value can be determined from analysis and computer simulations of network performance at a base station, but the actual performance is very difficult to predict accurately because it may depend on many factors such as traffic mix, cell size and local radio environment.

Therefore, a method of automatically adjusting $\rho_{th}$ would be of considerable benefit, both in terms of simplifying the management of the network and improving operating efficiency and user experience.

SUMMARY OF THE INVENTION

Exemplary embodiments of the invention aim to at least partially address some of the problems with the prior art described above.

According to one aspect of the invention, there is provided a communications apparatus for controlling call admission at a node in a network, the communications apparatus comprising: means for obtaining an outage rate for one or more current calls at the node; means for obtaining a blocking rate of admission requests at the node; means for adjusting a load threshold in dependence on the outage rate and the blocking rate; means for obtaining an estimate of a current network load at the node; and means for controlling admission of a call at the node in dependence on the estimated current load and the load threshold. Thus, the load threshold value can be adjusted based on parameters that directly affect the experience of a user of the network, that is blocking rate and outage rate, to automatically reach a desired trade-off between the blocking and outage when making admission control decisions.

The communications apparatus may be arranged to obtain one or more of the blocking rate, the outage rate and the estimate of current network load from one or more other elements in the network, or may obtain one or more of these parameters by determining them itself, for example from measurements of network operation.

The outage rate may be defined as the fraction of connected users not currently meeting minimum quality of service requirements, and in particular may be defined as the fraction of connected users not currently receiving at least a minimum required data rate.

Adjustment of the load threshold value may include: reducing the load threshold value by a first value if the obtained outage rate is more than a predetermined maximum outage value; increasing the load threshold value by a second value if the obtained outage rate is less than a predetermined minimum outage value; increasing the load threshold by the second value if $$\hat{P}_b(k) > \gamma \cdot (P_{outage} - P_{outage}^{(min)})$$

where $\hat{P}_b(k)$ is the obtained blocking rate, $P_{outage}$ is the obtained outage rate (or probability), $P_{outage}^{(min)}$ is the minimum desired outage rate and $\gamma$ is the blockage-to-outage ratio, and to decrease the load threshold if, $$\hat{P}_b(k) < \gamma \cdot (P_{outage} - P_{outage}^{(min)});$$

and/or only increasing the load threshold value when it is determined that blocking of new call requests is occurring at the node.

The first and second values may be manually predetermined, and may be equal or different values. Alternatively, the first and second values may be calculated, for example based on the obtained outage rate such that the load threshold may be reduced more quickly if a very large outage rate is experienced and/or the load threshold may be increased more quickly if low outage is experienced.

The blocking rate may be determined by measuring a number of blocked admission requests, $N_b(k)$, and a total number of transmission requests, $N_r(k)$, during a measurement interval, and using the equation:

$$\hat{P}_b(k) = \begin{cases} 0 & N_r(k) = 0 \\ \dfrac{N_b(k)}{N_r(k)} & \text{otherwise} \end{cases}.$$

The outage rate may be determined by block-averaging a measured fraction of users, $\tilde{P}_o(n)$, not currently meeting minimum quality of service requirements during an outage measurement period, $\Delta T_o$, over a threshold adjustment period, $\Delta T_{th}$, and using the equation:

$$\hat{P}_o(k) = \frac{1}{N} \sum_{n=0}^{N-1} \tilde{P}_o(n)$$

where $$N = \left\lfloor \frac{\Delta T_{th}}{\Delta T_o} \right\rfloor \dots$$

The outage may alternatively be determined by performing a continuous exponential averaging of a measured fraction of users, $\tilde{P}_o(n)$, not currently meeting minimum quality of service requirements during an outage measurement period, $\Delta T_o$, using the equation:

$$\hat{P}_o(k) = (1-\beta_o) \cdot \hat{P}_o(k-1) + \beta_o \tilde{P}_o(n),$$

where $0 < \beta_o \leq 1$ is an averaging weight.

In a further example, particularly applicable to LTE networks, a scheduler may supply measurement data that can be used in obtaining the outage rate using the equation:

$$\hat{P}_o(k) = \frac{\sum_{t}^{\Delta T_{th}} \sum_{i=0}^{B(t)} I(R_i^{req} - T_i(t))}{\sum_{t}^{\Delta T_{th}} B(t)},$$

where $T_i(t)$ is a throughput estimate for each bearer which is updated every subframe, $R_i^{req}$ is a required bit rate for each bearer, $B(t)$ is the number of bearers present in sub-frame t, and the indicator function $I(x)$ is defined $$I(x) = \begin{cases} 1 & \text{if } x > 0 \\ 0 & \text{otherwise} \end{cases}.$$

The node may be a base station, and in particular, the node may be a base station in a mobile communications network. According to some implementations, the mobile communications network is compliant with the LTE standards.

According to another aspect of the invention, there is provided a method of adjusting a load threshold for use in call admission control at a node in a network, the method comprising: obtaining an outage rate for one or more current calls at the node; obtaining a blocking rate of admission requests at the node; and adjusting the load threshold in dependence on the outage rate and the blocking rate.

According to another aspect of the invention there is provide a computer implementable product comprising computer implementable instructions for causing one or more computer devices to become configured as any of the above communications apparatus.

The invention provides, for all methods disclosed, corresponding computer programs or computer program products for execution on corresponding equipment, the equipment itself (user equipment, nodes or components thereof) and methods of updating the equipment.

BRIEF DESCRIPTION OF THE DRAWINGS

An exemplary embodiment of the invention will now be described, by way of example, with reference to the accompanying drawings in which.

DESCRIPTION OF THE EXEMPLARY EMBODIMENTS

Overview

Figure 1:
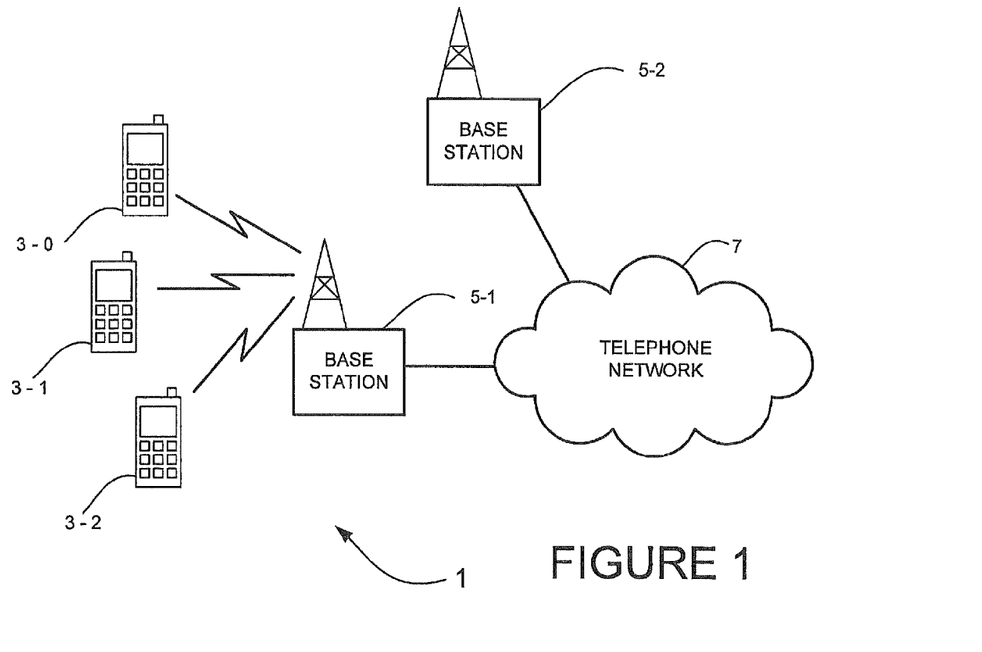
FIG. 1 schematically illustrates a mobile telecommunication system of a type to which the invention is applicable.

FIG. 1 schematically illustrates a mobile (cellular) telecommunication system 1 in which users of mobile telephones (MT) 3-0, 3-1, and 3-2 can communicate with other users (not shown) via one of the base stations 5-1 or 5-2 and a telephone network 7. A number of uplink and downlink communications resources (sub-carriers, time slots etc) are available for the wireless link between the mobile telephones 3 and the base stations 5. In this embodiment, the base stations 5 allocate downlink resources to each mobile telephone 3 depending on the amount of data to be sent to the mobile telephone 3. Similarly, the base stations 5 allocate uplink resources to each mobile telephone 3 depending on the amount and type of data the mobile telephone 3 has to send to the base station 5.

The base station generally provides services to the mobile telephones by establishing a radio bearer for each service that is requested. For example, one radio bearer may be defined for carrying video data, one may be defined for carrying audio data, one may be defined for carrying bursty web traffic etc. Various types of radio bearers are defined, depending on the quality of service associated with the type of data to be carried by the radio bearer. For example, a radio bearer used for video or audio traffic may be provided in a higher class than radio bearers used for internet traffic—as users can tolerate delays with internet traffic but cannot tolerate delays in the delivery of video data. At the time of establishing a new connection, radio bearers are established that will provide the required service with the desired quality of service.

When a new connection is to be established, the base station 5 must make sure that it has the resources to be able to provide the desired service and must be able to provide the service without affecting the service of existing connections. To be able to achieve this, the base station 5 controls admission of new connections into the network based on the existing load on the base station 5. A new call will only be admitted to the network if the existing load on the base station 5 and the expected load caused by the new connection is less than a threshold load value, $\rho_{th}$.

In this embodiment, the threshold load value, $\rho_{th}$, is adjusted based on a blocking rate (or probability) for calls in the system and a measurement of Quality of Service (QoS). Blocking rate or probability is determined by counting the number of call attempts made, and the number of blocked calls, at the base station 5.

The QoS measure used in the present embodiment is based on a measurement of outage. The probability of outage, or outage rate, is defined as the fraction of connected users who are not currently meeting their minimum QoS requirement. This provides a measurement of QoS that can be continuously measured and updated, and that tends to increase smoothly as the system approaches overload. Thus, action may be taken before significant numbers of calls are blocked at the base station, reducing the impact on users of the network. This has advantages over QoS measurement methods which rely on using the number of dropped calls as an indication of QoS, because dropped calls usually only occur when the system has already become heavily overloaded. Accordingly, it is difficult to detect the onset of overload, based on the number of dropped calls, and thus avoid the system becoming heavily overloaded (when a number of dropped calls are experienced).

Furthermore, blocking probability (or blocking rate) and QoS are both directly related to user experience, so it would therefore be advantageous to use measurements of these quantities to control the setting of $\rho_{th}$, such that adjustment of the threshold value depends directly on the user experience of the network.

Base Station

Figure 4:
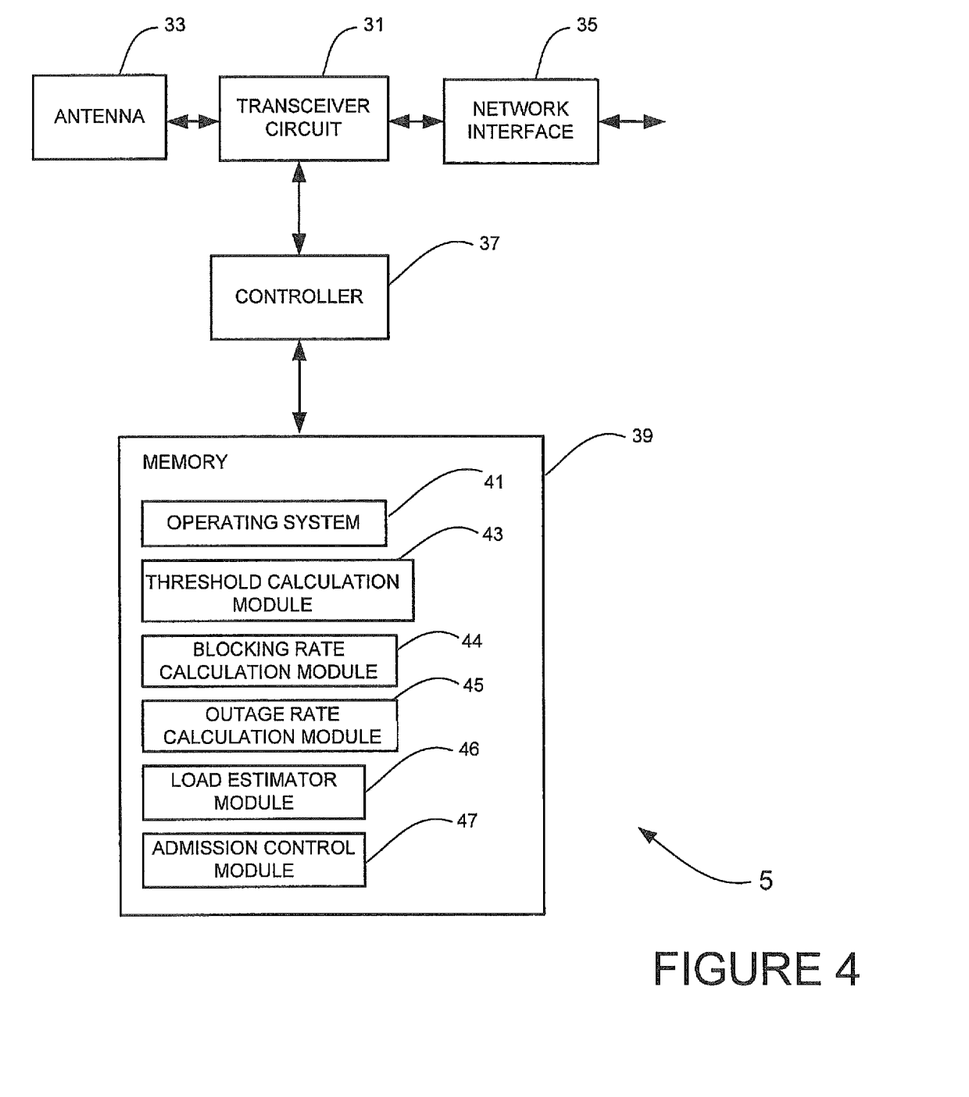
FIG. 4 schematically illustrates a base station forming part of the system shown in FIG. 1.

FIG. 4 is a block diagram illustrating the main components of each of the base stations 5 shown in FIG. 1. As shown, each base station 5 includes transceiver circuitry 31 which is operable to transmit signals to and to receive signals from the mobile telephones 3 via one or more antennae 33 and which is operable to transmit signals to and to receive signals from the telephone network 7 via a network interface 35. A controller 37 controls the operation of the transceiver circuitry 31 in accordance with software stored in memory 39. The software includes, among other things, an operating system 41 and a threshold calculation module 43, a blocking rate calculation module 44, an outage rate calculation module 45, a load estimator module 46 and an admission control module 47. The operating system 41 is operable to control operation of the base station. The threshold calculation module 43 is operable to calculate a load threshold value for use in admission control decisions in accordance with the invention. Blocking rate calculation module 44 and outage rate calculation module 45 respectively calculate a current blocking rate and a current outage rate, which are supplied to the threshold calculation module 43 for use in calculating the load threshold. The load estimator module 46 is responsible for determining load estimates for existing radio bearers and newly requested radio bearers and for reporting these load estimates to the admission control module 47. The admission control module 47 is responsible for using the load estimates determined by the load estimator module 46, along with the load threshold value calculated by the threshold calculation module 43 to determine whether or not to admit a requested new radio bearer; for congestion control; or for load balancing mobile telephones 3 between cells.

In the above description, the base station 5 is described, for ease of understanding, as having a number of discrete modules (such as the threshold calculation module 43, the blocking rate calculation module 44, the outage rate calculation module 45, the load estimator module 46, the admission control module 47 etc). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Threshold Adjustment Method

Figure 2:
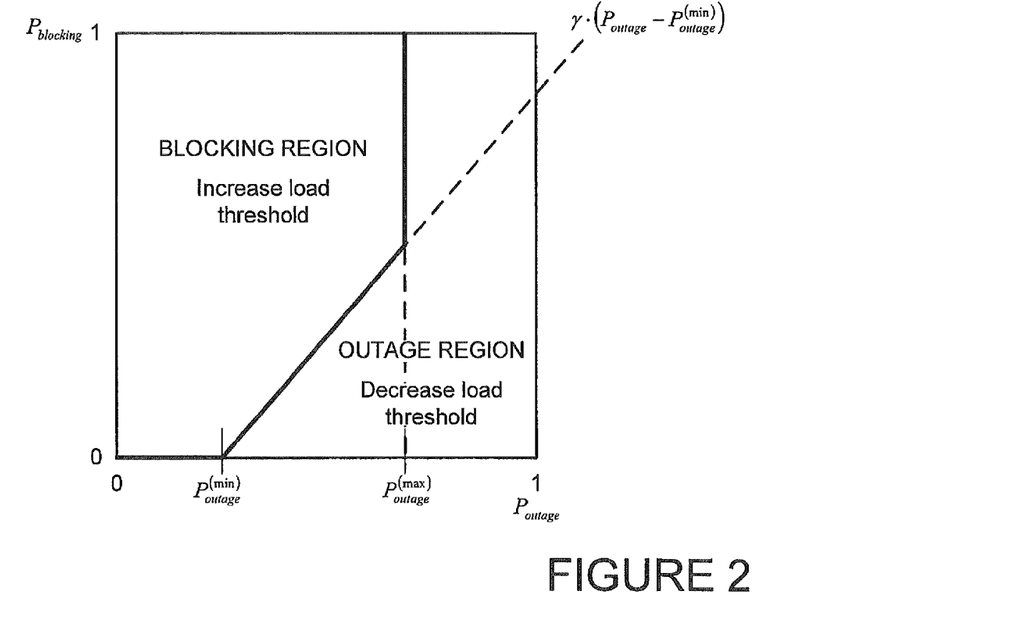
FIG. 2 shows a graph illustrating blocking and outage regions.

The basic mechanism of the threshold adjustment method is illustrated in FIG. 2. This mechanism is implemented in the threshold calculation module 43 to determine the threshold load value to be used in admission control decisions.

Over a configurable measurement interval $\Delta T_{th}$ (for example around 60 seconds), the current blocking rate and outage rate are estimated by the blocking rate calculation module 44 and outage rate calculation module 45. If the measured blocking and outage rates lie in the region labelled 'Blocking Region' in FIG. 2, then the load threshold, $\rho_{th}$, is increased by a small amount to try to reduce the blocking rate at the base station 5. If the measured blocking and outage rates lie in the 'Outage Region' then the load threshold, $\rho_{th}$, is decreased by a small amount to try to reduce the outage. Over time, the system will tend to converge to a point somewhere on the boundary between the Blocking Region and Outage Region. The exact point to which it converges depends on the level of offered traffic, the offered traffic being the total throughput that the network would have to provide in order to meet the requirements of all users who want to access the system.

The boundary between the Blocking Region and Outage Region is controlled by three parameters which can be set by the network operator.

The first parameter is $P_{outage}^{(max)}$. This represents the maximum outage rate that can be tolerated under any circumstances. If the measured outage rate is higher than $P_{outage}^{(max)}$ then the load threshold, $\rho_{th}$, is always decreased. The purpose of this parameter is to prevent the outage rate from becoming too high if the offered traffic is very high. In very high offered traffic conditions, the algorithm maintains the outage rate at $P_{outage}^{(max)}$ and allows the blocking to rise as the offered traffic increases. $P_{outage}^{(max)}$ is a value between 0 and 1.

The second parameter is $P_{outage}^{(min)}$. If the measured outage rate is below this level, it is assumed that the outage rate is low enough to be ignored, and the threshold, $\rho_{th}$, is always increased if blocking occurs. This is based on the assumption that when the offered traffic is low and the system is lightly loaded, there is little or no reason to block any calls, so any blocking event should result in the threshold being increased. $P_{outage}^{(min)}$ is a value between 0 and 1 and is smaller than $P_{outage}^{(max)}$.

The last parameter is the blocking-to-outage ratio, $\gamma$. This allows the operator to control the required balance between the blocking rate and outage rate. At each update, the algorithm effectively compares $P_{blocking}$ with $\gamma \cdot (P_{outage} - P_{outage}^{(min)})$ and adjusts the load threshold, $\rho_{th}$, according to which one is larger. Thus, reducing $\gamma$ will reduce the blocking rate and increase the outage rate, whereas increasing $\gamma$ will increase the blocking rate and reduce the outage rate. $\gamma$ can be any non-negative value. This parameter reflects the fact that as offered traffic increases, a higher outage rate may be tolerated, in order to reduce the blocking rate. If required, $\gamma$ can be set to zero, in which case it has no effect, and the algorithm will simply attempt to minimise the blocking rate while keeping the outage rate below $P_{outage}^{(max)}$.

In the Outage Region the load threshold, $\rho_{th}$, is only decreased if blocking is occurring, unless $\hat{P}_o(m,k) \geq P_{outage}^{(min)}(m)$. This helps to avoid the threshold drifting towards zero when the offered traffic load is very low.

Figure 3:
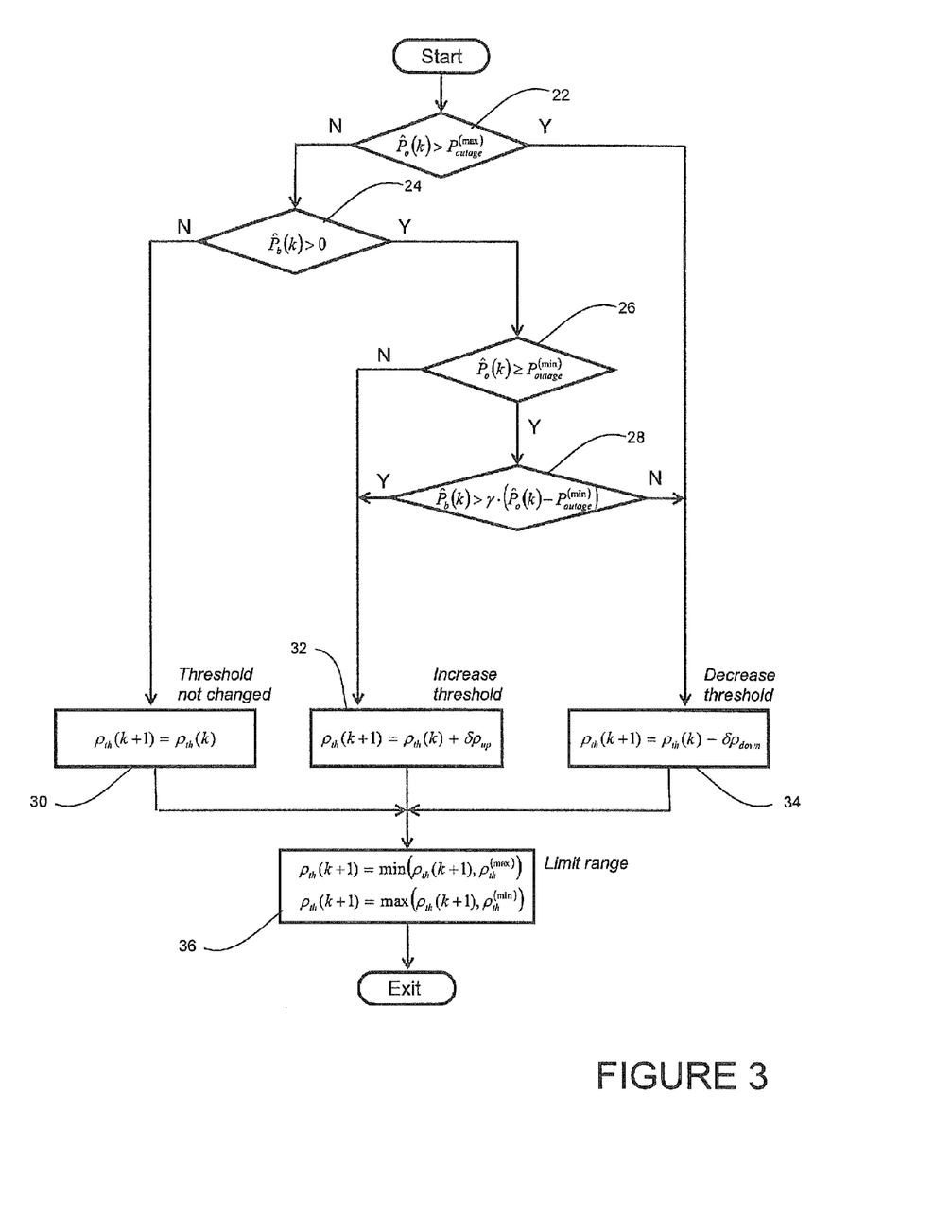
FIG. 3 illustrates a flow chart of a threshold update method according to an embodiment of the invention.

The threshold adjustment method is illustrated in the flow chart of FIG. 3. The method shown in the flow chart is executed at the end of each measurement interval. $\hat{P}_o(k)$ and $\hat{P}_b(k)$ are respectively the estimated outage and blocking rate at the end of the $k^{th}$ measurement interval. $\rho_{th}(k)$ is the load threshold at the start of the $k^{th}$ measurement interval.

$\delta\rho_{up}$ and $\delta\rho_{down}$ are step-size parameters which control the rate of adjustment. These parameters are both greater than zero.

$\rho_{th}^{(max)}$ and $\rho_{th}^{(min)}$ are parameters which set respectively the maximum and minimum allowed values of $\rho_{th}$. These parameters may be used to restrict the operating range of the threshold adjustment algorithm.

As illustrated in FIG. 3, execution of the threshold adjustment method starts with a determination of whether a measured outage $\hat{P}_o(k)$ rate determined by outage rate calculation module 45 is greater than the maximum allowable outage rate $P_{outage}^{(max)}$, at decision block 22. If it is determined that $\hat{P}_o(k) > P_{outage}^{(max)}$, then execution proceeds to block 34 where the load threshold is decremented by $\delta\rho_{down}$, else execution proceeds to block 24 to determine if the blocking rate determined by blocking rate calculation module 44, $\hat{P}_b(k)$, is greater than zero (i.e. if any blocking is occurring). If no blocking is occurring execution proceeds to block 30 and no change is made to the current load threshold value. If blocking is occurring execution proceeds to block 26. A determination is then made as to whether $\hat{P}_o(k) \geq P_{outage}^{(max)}$, if so execution proceeds to block 32 and the threshold is incremented by $\delta\rho_{up}$, else a final comparison is made of, $\hat{P}_b(k) > \gamma \cdot (P_{outage} - P_{outage}^{(min)})$. If $\hat{P}_b(k)$ is greater than $\gamma \cdot (P_{outage} - P_{outage}^{(min)})$, then execution proceeds to block 32 to increment the threshold, and if $\hat{P}_b(k)$ is not greater than $\gamma \cdot (P_{outage} - P_{outage}^{(min)})$ then execution proceeds to block 34 to decrement the threshold by $\delta\rho_{down}$. Finally, a check is made, in block 36, to ensure that the adjusted load threshold remains within the desired range, and if not the load parameter is adjusted to $\rho_{th}^{(max)}$ or $\rho_{th}^{(min)}$ as appropriate.

Blocking Rate Calculation

Measurement of the blocking rate $\hat{P}_b(k)$ can be achieved by simply measuring the number of blocked admission requests made during a measurement interval and comparing the number of blocked requests with the total number of admission requests. More formally, if $N_r(k)$ is the total number of AC admission requests made during the $k^{th}$ measurement interval, and $N_b(k)$ is the number of these attempts that were blocked by the admission control module 47. Then $\hat{P}_b(k)$ is calculated in the blockage rate calculation module 44 as follows:

$$\hat{P}_b(k) = \begin{cases} 0 & N_r(k) = 0 \\ \frac{N_b(k)}{N_r(k)} & \text{otherwise} \end{cases} \quad (2)$$

Note that $\hat{P}_b(k)=0$ if $N_r(k)=0$ (i.e. if there are no admission control requests).

Outage Rate Calculation

The outage rate is defined above as the fraction of bearers that are currently not achieving their Quality of Service (QoS) requirement. One way of expressing (or approximating) the QoS requirement is as a required data rate, $R^{req}$, such that a bearer is considered to be in outage if the throughput it is currently achieving is lower than $R^{req}$.

One potential problem with measuring outage in this way is that it depends on the measurement interval. For example, suppose a call lasts for 60 seconds. During the first 30 seconds, the user achieves 95% of the required rate. During the final 30 seconds, the user achieves 110% of the required rate. If the outage is measured, say, every 10 seconds, then this user would be in outage for 50% of the time. But if the outage is measured every 60 seconds then this user will not be in outage at all, because the average achieved rate over the call is greater than the required rate. In general, the measured outage is likely to decrease as the measurement period is increased, because there is more chance that the throughput will average out to a value greater than the required rate. There is no 'correct' period for measuring outage. However, one way to choose the measurement period is to consider how long it would take for the outage to become noticeable to the user. In the case of a streaming service, for example, this might be of the order of a few seconds. It will be appreciated by the skilled practitioner that different measurement periods would be appropriate depending on the type of service offered.

Two possible methods of measuring outage and calculating an outage rate in the outage rate calculation module 45 are now described which are particularly suitable for use in wireless communications standards implemented in accordance with the LTE standard.

Direct Throughput Measurement

Suppose that during each outage measurement period of duration $\Delta T_o$ seconds, the following quantities are collected for each bearer:

$S_i$ The total number of bits delivered for bearer i.

$A_i$ The number of sub-frames in which bearer i has data to send (i.e. for which the queue is not empty).

A bearer is considered to be in outage if $S_i < A_i R_i^{req}$, where $R_i^{req}$ is the required bit rate in bits/sub-frame.

Let $\tilde{P}_o(n)$ be the fraction of bearers which are in outage during the $n^{th}$ outage measurement period. $\tilde{P}_o(n)$ may be block-averaged over the threshold adjustment period $\Delta T_{th}$ to obtain $\hat{P}_o(k)$ as follows.

$$\hat{P}_o(k) = \frac{1}{N} \sum_{n=0}^{N-1} \tilde{P}_o(n) \quad (3)$$

where $$N = \left\lfloor \frac{\Delta T_{th}}{\Delta T_o} \right\rfloor.$$

Alternatively, instead of block averaging, a continuous exponential averaging can be applied, i.e. $\hat{P}_o(k)=(1-\beta_o)\cdot\hat{P}_o(k-1)+\beta_o\tilde{P}_o(n)$, where $0<\beta_o\leq 1$ is an averaging weight.

(Note that the averaging over $\Delta T_{th}$ smoothes the estimate, but it is not equivalent to extending the outage measurement period, because decisions about whether a bearer is in outage are still made every $\Delta T_o$ seconds).

A disadvantage of this scheme is that it requires memory to store $S_i$, $A_i$ and $R_i^{req}$ for each bearer.

From Scheduler Throughput Measurement

In an LTE system, the allocation of radio resources to individual bearers is controlled by the MAC scheduler. Typically the MAC scheduler will employ a Proportional Fair (PF) scheduling algorithm, or a derivative thereof.

A PF-based scheduler maintains a throughput estimate $T_i(t)$ for each bearer, which is updated every sub-frame, typically by exponential averaging.

In any sub-frame, we may consider a bearer to be in outage if $T_i(t)<R_i^{req}$. Let $B(t)$ be the number of bearers present in sub-frame t. Then we can estimate $\hat{P}_o(k)$ as follows.

$$\hat{P}_o(k) = \frac{\sum_{t}^{\Delta T_{th}} \sum_{i=0}^{B(t)} I(R_i^{req} - T_i(t))}{\sum_{t}^{\Delta T_{th}} B(t)} \quad (4)$$

where the indicator function $I(x)$ is defined $$I(x) = \begin{cases} 1 & \text{if } x > 0 \\ 0 & \text{otherwise} \end{cases}$$

The advantage of this method is that it is simpler to implement and almost no additional memory storage is required. The disadvantage is that the outage measurement period is effectively controlled by the time constant of the averaging used for $T_i(t)$. The averaging period that gives the best scheduler performance may not be optimum for outage measurement.

MODIFICATIONS AND ALTERNATIVES

A number of detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

The above example embodiments have been described as using a calculated outage parameter, however it will be recognized that the above described threshold control method is equally applicable to a system in which a call dropping probability is used in place of the outage probability.

Figure 5:
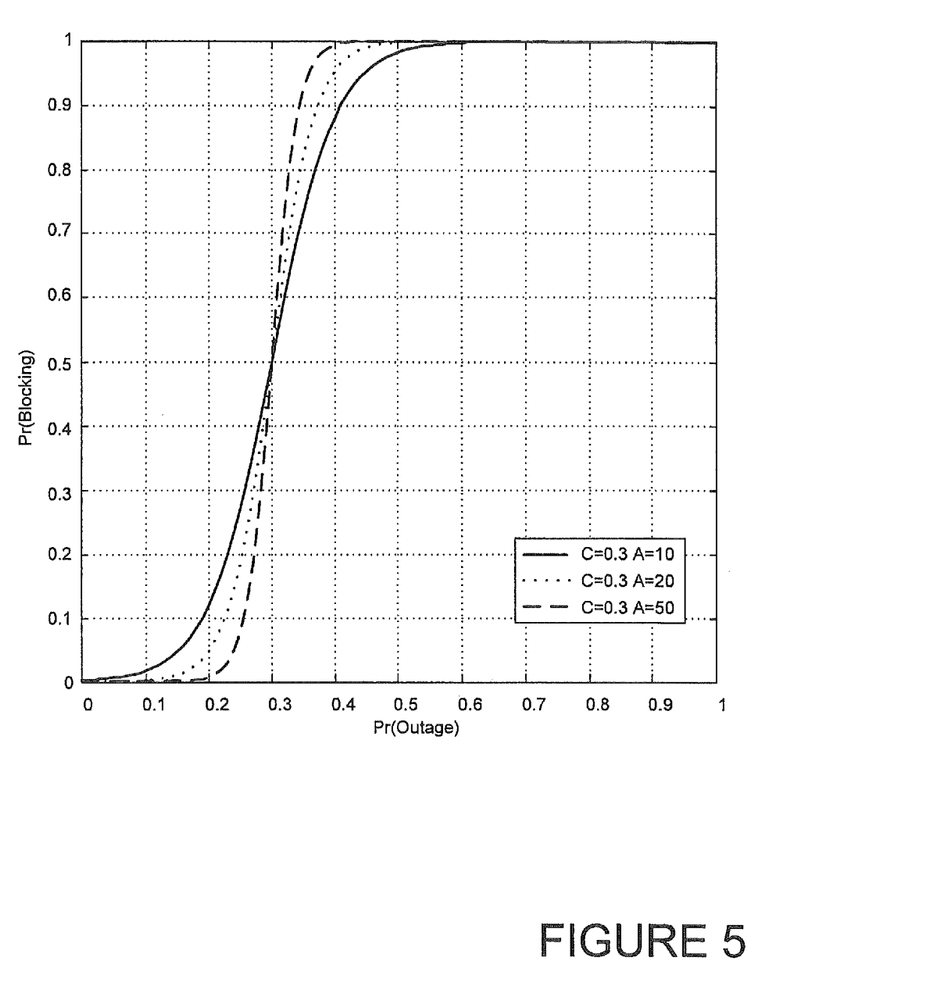
FIG. 5 shows a graph illustrating an alternative definition of blocking and outage regions.

The boundary between the Outage Region and Blocking Region in FIG. 2 is described with three straight line segments, but it could be defined in terms of more than three segments (with the addition of further parameters as necessary) to increase flexibility. Alternatively the boundary could be defined in terms of a continuous function relating $P_{outage}$ and $P_{blocking}$, for example:

$$P_{blocking} = \frac{1}{1 + e^{-A(P_{outage} - C)}} \quad (5)$$

where $A>0$ and $0<C<1$ are configurable parameters (see FIG. 5).

Another possible enhancement concerns the step-size parameters $\delta\rho_{up}$ and $\delta\rho_{down}$. In order to recover quickly from overload situations, it may be advantageous to use a larger value of $\delta\rho_{down}$ when outage is high. Similarly, at low offered load the threshold may increase slowly because blocking events are rare, so it may be advantageous to use a larger value of $\delta\rho_{up}$ when outage is low. Some possible solutions are as follows:

- Use a larger value of $\delta\rho_{down}$ when outage is high, e.g. when $\hat{P}_o(k) > P_{outage}^{(max)}$.
- Use a larger value of $\delta\rho_{up}$ when outage is low, e.g. when $\hat{P}_o(k) < P_{outage}^{(min)}$.
- Make $\delta\rho_{down}$ proportional to (or some other increasing function of) $\hat{P}_o(k)$.
- Make $\delta\rho_{up}$ proportional to (or some other increasing function of) $1 - \hat{P}_o(k)$.
- Make the magnitude of $\delta\rho_{up}$ and $\delta\rho_{down}$ proportional to (or some other increasing function of) the distance from the observed measurement (i.e. the point $\{\hat{P}_o(k), \hat{P}_b(k)\}$) to the closest point on the Blocking/Outage boundary.

According to FIG. 3, if no blocking is occurring then the load threshold is not increased, even if the outage is low, because in this case low outage indicates low offered traffic rather than excessive blocking. However in some implementations, the threshold may be increased in this case, because as noted above the threshold may otherwise take a long time to converge. One possible way to achieve this is would be to increase the threshold (perhaps by an amount smaller than $\delta\rho_{up}$) if $\hat{P}_o(k) < P_{outage}^{(min)}$.

In some implementations, it may be desirable to differentiate between different types of admission request. For example, it is common practice to use a higher admission control threshold for users being handed over from a neighbouring cell than for new calls. This can be accommodated in the threshold adjustment algorithm by maintaining a single adaptive threshold, and then applying (configurable) fixed offsets to it to obtain a set of thresholds corresponding to the different types of admission request. In this case, it may be preferable to apply the limitation to the range set by $\rho_{th}^{(min)}$ and $\rho_{th}^{(max)}$ after addition of the fixed offset.

Furthermore, in some systems such as those implemented in accordance with the LTE standard, users (or more specifically bearers) are classified according to a Quality Class Indicator (QCI) which determines the QoS with which they should be served. In this case it may be appropriate to maintain a separate admission threshold for each QCI. One way to do this is to implement a separate instance of the threshold adjustment algorithm for each QCI.

In the above embodiment, a mobile telephone based telecommunications system was described. As those skilled in the art will appreciate, the admission control techniques described in the present application can be employed in any communications system. In the general case, the base stations and the mobile telephones can be considered as communications nodes or devices which communicate with each other. Other communications nodes or devices may include access points and user devices such as, for example, personal digital assistants, laptop computers, web browsers, etc.

In the above embodiments, a number of software modules were described. As those skilled will appreciate, the software modules may be provided in compiled or un-compiled form and may be supplied to the base station as a signal over a computer network, or on a recording medium. Further, the functionality performed by part or all of this software may be performed using one or more dedicated hardware circuits. However, the use of software modules is preferred as it facilitates the updating of the base station 5 in order to update its functionality. Similarly, although the above embodiments employed transceiver circuitry, at least some of the functionality of the transceiver circuitry can be performed by software.

In the above embodiments, a number of different techniques were described for calculating blockage rate and outage rate estimations. The blocking rate calculator and outage rate calculator may be configured to use any of the techniques described above and may select the method to be used in dependence upon the information/measurements.

In the above embodiments, the base station performed the admission control. In other embodiments, other communications nodes may perform the admission control. Such other communications node may form part of the core network or may be located in a gateway device between the base station and the core network.

Various other modifications will be apparent to those skilled in the art and will not be described in further detail here.

This application is based upon and claims the benefit of priority from United Kingdom patent application No. 1016362.4, filed on Sep. 29, 2010, the disclosure of which is incorporated herein in its entirety by reference.

The invention claimed is:

1. A communications apparatus for controlling call admission at a node in a network, comprising a controller configured to:
   obtain an outage rate for one or more current calls at the node;
   obtain a blocking rate of admission requests at the node;
   adjust a load threshold in dependence on the outage rate and the blocking rate;
   obtain an estimate of a current network load at the node; and
   control admission of a call at the node in dependence on the estimated current load and the load threshold,
   wherein the controller is configured to adjust the load threshold by reducing the load threshold value by a first value when the obtained outage rate is more than a predetermined maximum outage value, and
   wherein said first value is calculated in dependence on the obtained outage rate.

2. The communications apparatus of claim 1, wherein the outage rate comprises the fraction of connected users not currently meeting minimum quality of service requirements.

3. The communications apparatus of claim 1, wherein the outage rate further comprises the fraction of connected users not currently receiving at least a minimum required data rate.

4. The communications apparatus of claim 1, wherein the controller is configured to adjust the load threshold by increasing the load threshold value by a second value if the obtained outage rate is less than a predetermined minimum outage value.

5. The communications apparatus of claim 4, wherein the controller is configured to adjusting the load threshold by increasing the load threshold value only when an obtained blocking rate is greater than zero.

6. The communications apparatus of claim 4, wherein the controller is configured to adjust the load threshold by increasing the load threshold by the second value if, $$\hat{P}_b(k) > \gamma \cdot (P_{outrage} - P_{outrage}^{(min)})$$

where $\hat{P}_b(k)$ is the determined blocking rate, $P_{outrage}$ outage is the obtained outage probability, $P_{outrage}^{(min)}$ is the minimum desired outage rate and $\gamma$ is the blockage-to-outage ratio, and outage to decrease the load threshold if, $$\hat{P}_b(k) < \gamma \cdot (P_{outage} - P_{outrage}^{(min)}).$$

7. The communication apparatus of claim 1, wherein the controller is configured to obtain the blocking rate, $\hat{P}_b(k)$, by measuring a number of blocked admission requests, $N_b(k)$, and a total number of transmission requests, $N_r(k)$, during a measurement interval, wherein the blocking rate is determined using:

$$\hat{P}_b(k) = \begin{cases} 0 & N_r(k) = 0 \\ \frac{N_b(k)}{N_r(k)} & \text{otherwise} \end{cases}.$$

8. The Communication apparatus of claim 1, wherein the controller is configured to obtain the outage rate, $\hat{P}_o(k)$, by block averaging a measure fraction of users, $\tilde{P}_o(n)$, not currently meeting minimum quality of service requirements during an outage measurement period, $\Delta T_o$, over a threshold adjustment period, $\Delta T_{th}$, using:

$$\hat{P}_o(k) = \frac{1}{N} \sum_{n=0}^{N-1} \tilde{P}_o(n)$$

where $$N = \left\lfloor \frac{\Delta T_{th}}{\Delta T_o} \right\rfloor \ldots.$$

9. The communication apparatus of claim 1, wherein the controller is configured to obtain the outage rate, $\hat{P}_o(k)$ by performing continuous exponential averaging of a measured fraction of users, $\tilde{P}_o(n)$, not currently meeting minimum quality of service requirements during an outage measurement period, $\Delta T_o$, using $$\hat{P}_o(k) = (1-\beta_o) \cdot \hat{P}_o(k-1) + \beta_o \tilde{P}_o(n),$$

where $0 < \beta_o < 1$ is an average weight.

10. The communication apparatus of claim 1, wherein the controller is configured to obtain the outage rate, $\hat{P}_o(k)$ using $$\hat{P}_o(k) = \frac{\sum_{t}^{\Delta T_{th}} \sum_{i=0}^{B(t)} I(R_i^{req} - T_i(t))}{\sum_{t}^{\Delta T_{th}} B(t)},$$

Where $T_i(t)$ is a throughput estimate for each bearer which is updated every subframe, $R_i^{req}$ is a required bit rate for each bearer, $B(t)$ is the number of bearers present in subframe t, and the indicator function $l(x)$ is defined $$I(x) = \begin{cases} 1 & \text{if } x > 0 \\ 0 & \text{otherwise} \end{cases}.$$

11. The communication apparatus of claim 1, wherein the node comprises a base station.

12. The communication apparatus of claim 1, wherein the network comprises a mobile communication network.

13. The communication apparatus of claim 12, wherein the mobile communication network comprises a network complaint with the Long Term Evolution (LTE) standard.

14. A non-transitory computer readable recording medium comprising computer implementable instructions for causing one or more programmable computer devices to become configured as the communications apparatus claimed in claim 1.

15. The communication apparatus of claim 1, wherein the controller is configured to adjust the load threshold by increasing the load threshold value by a second value if the obtained outage rate is less than a predetermined minimum outage value.

16. A method of adjusting a load threshold for use in call admission control at a node in a network, comprising:
    obtaining an outage rate for one or more current calls at the node;
    obtaining a blocking rate of admission requests at the node;
    adjusting the load threshold in dependence on the outage rate and the blocking rate;
    obtaining an estimate of a current network load at the node; and
    controlling admission of a call at the node in dependence on the estimated current load and the load threshold,
    wherein the adjusting the load threshold comprises reducing the load threshold value by a first value if the obtained outage rate is more than a predetermined maximum outage value, and
    wherein said first value is calculated in dependence on the obtained outage rate.

* * * * *